United States Patent
Srivastava et al.

[19]

[11] Patent Number: 6,067,478
[45] Date of Patent: *May 23, 2000

[54] CONTROL SYSTEM WITH MACRO CREATION BASED ON RECORDING RESPONSES

[75] Inventors: Saurabh Srivastava, Sunnyvale; Paul Chambers, San Jose, both of Calif.

[73] Assignee: Philips Electronics North America Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/787,032

[22] Filed: Jan. 28, 1997

Related U.S. Application Data

[63] Continuation of application No. 08/741,161, Oct. 29, 1996, abandoned.

[51] Int. Cl.[7] .................................................. G05B 19/42
[52] U.S. Cl. ................................................. 700/86; 700/88
[58] Field of Search ...................... 345/113, 156, 345/326, 347, 352; 318/561; 348/734; 395/701, 705; 710/15, 16, 67; 700/28, 83, 32, 38, 39, 86–88, 11, 12, 17, 18, 19, 27; 340/825.06, 825.15, 825.22, 825.69, 825.72

[56] References Cited

U.S. PATENT DOCUMENTS

| | | | |
|---|---|---|---|
| 4,078,195 | 3/1978 | Mathias et al. | 318/561 |
| 5,086,385 | 2/1992 | Launey et al. | 364/188 |
| 5,252,951 | 10/1993 | Tannenbaum et al. | 345/156 |
| 5,365,282 | 11/1994 | Levine | 348/734 |
| 5,396,591 | 3/1995 | Goss | 345/347 |
| 5,400,246 | 3/1995 | Wilson et al. | 364/146 |
| 5,617,114 | 4/1997 | Bier et al. | 345/113 |
| 5,682,490 | 10/1997 | Sumino et al. | 395/352 |

OTHER PUBLICATIONS

"Structured Computer Organization", third edition, Andrew S. Tanenbaum, Prentice Hall International Editions, 1990, pp. 412–417.

"WordPerfect version 6.0 User's Guide", 1994, p. 524.

*Primary Examiner*—William Grant
*Assistant Examiner*—Steven R. Garland
*Attorney, Agent, or Firm*—Peter Verdonk

[57] ABSTRACT

A macro is created for a system that controls multiple electronic devices. Stimuli are supplied to the devices to trigger the desired responses. The responses are recorded. The macro contains a sequence of instructions. Each particular instruction requests the device involved to re-establish its particular state that caused it to provide a particular response.

4 Claims, 1 Drawing Sheet

CONTROL SYSTEM WITH MACRO CREATION BASED ON RECORDING RESPONSES

This is a continuation of application Ser. No. 08/741,161, filed Oct. 29, 1996 now abandoned.

FIELD OF THE INVENTION

The invention relates to a control system and to a method for control of at least a single electronic device.

BACKGROUND ART

Consider an electronic system for control of one or more electronic devices. The system responds to a stimulus by changing its state accordingly. The system has control means that issues a sequence of instructions or commands that specify the devices to behave in a predetermined manner. Such a system provided with a user-interface enables a user to enter commands into the system in order to control the system via the control means. Within this context, a macro is a particular sequence of stimuli (instructions, commands) that is performed automatically upon a call. See for an explanation of macros at the assembly level, e.g., "Structured Computer Organization", third edition, Andrew S. Tanenbaum, Prentice Hall International Editions, 1990, pp. 412–417. As another example, consider word processing in, e.g., WordPerfect 6.0. See "WordPerfect version 6.0 User's Guide", 1994, p.524. In order to create a macro, the commands resulting from the keystrokes or mouse selections are recorded, not the keystrokes themselves. For example, instead of recording all keystrokes involved in the commands for changing the lay-out of a page of text, the commands themselves are recorded. Playing the macro will repeat the commands recorded.

OBJECT OF THE INVENTION

The inventor has realized that the conventional manner of creating a macro has several drawbacks. It requires either the user or the control means to understand the format of the commands in order to create a macro. For, e.g., a home entertainment system with integrated audio and video equipment, this has the obstacle of the user being forced to learn the technicalities. Moreover, each system has it's own proprietary commands and instructions. Accordingly, the process of creating a macro differs for every individual brand of equipment. It is therefore an object of the invention to provide a system that supports a method of creating a macro, wherein the method is generic and forward-compatible with all kinds of equipment.

SUMMARY OF THE INVENTION

To this end, the invention provides a control system that comprises at least a single electronic device; and control means coupled to the device for providing a respective stimulus to the device in order to trigger a respective response of the device. The control means comprises a storage to record specific ones of the responses, and feedback means for supplying to the device an instruction to re-establish a state of the device that caused the device to supply the specific response.

The control means treats the responses that it records as 'sealed envelopes', and requires the device to implement some functionality to assist in managing those 'sealed envelopes', without the control means having to understand their contents. Without this assistance, it would be impossible to construct a highly-functional and forward-compatible macro system. Accordingly, in order to create a macro, neither the control means nor the user needs to interpret the specific responses or the associated stimuli. It suffices to instruct the device to re-establish the states in a desired order determined by a selected sequence of the specific responses recorded. The creation of a macro in the system of the invention is thus rendered forward compatible in the sense that the format of the responses only needs to be understood by the originating device, and not by the control means. The specific instruction issued by the control means identifies the previously received specific response, e.g., as a parameter.

BRIEF DESCRIPTION OF THE DRAWINGS

The invention is explained by way of example and with reference to the accompanying drawings, wherein.

Throughout the figures, same reference numerals indicate similar or corresponding features.

DETAILED EMBODIMENTS

Block diagram

Figure 1:
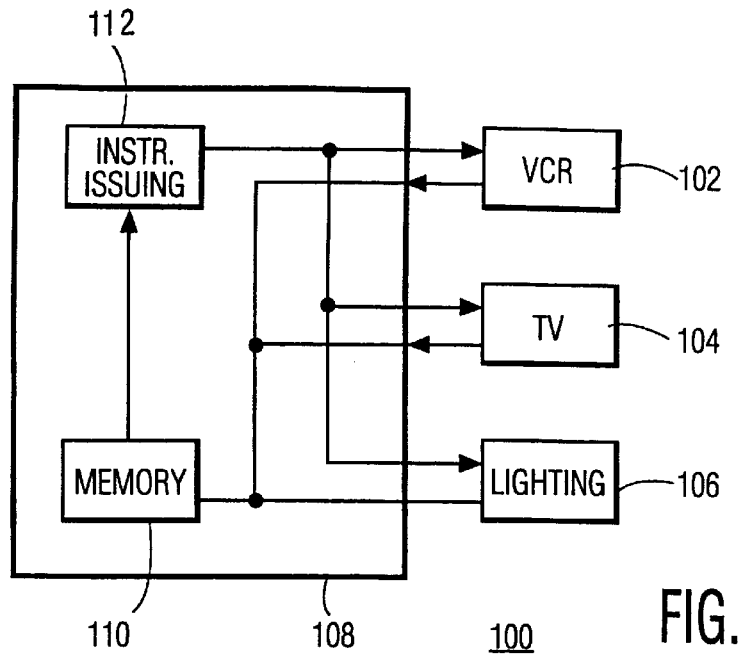
FIG. 1 is a block diagram of a system in the invention.

FIG. 1 is a block diagram of a system 100 according to the invention. System comprises electronic devices 102, 104 and 106, and control means 108. For example, system 100 is a home entertainment system wherein device 102 includes a VCR, device 104 includes a TV, and device 106 includes a group of lighting units. Control means 108 enables control of the operation of devices 102–106, either directly or indirectly via respective software representations of devices 102–106 and of their respective user-interfaces. In the latter case, the software representations operated upon by control means 108 hide the idiosyncrasies of the associated one of devices 102–106. The software representation presents a more uniform interface for higher levels of software, similarly to device drivers in an operating system. By encapsulating the variable complexity of the task within a software representation, it can be made as simple or as sophisticated as needed to bring the capabilities up to a common level. Since the level of interface is common to the software representations, applications can manipulate, in the same manner, devices 102–106 which may embody very different levels of sophistication.

Control means 108 comprises a memory 110. In a macro-creation mode, memory records responses of devices 102–106 to stimuli supplied to them via control means 108 under control of the user. For example, when the user has inserted a tape in VCR 102, the user activates a particular one among his TV sets, e.g., TV 104, and selects the channel that corresponds with this TV's connection to VCR 102. Then, the user dims the light to a certain level. The responses of devices 102–106 to user commands are recorded in order by memory 110 as an ordered sequence of corresponding and identifiable items.

Control means 108 further comprises an instruction issuing machine 112 coupled to memory 110. In a macro-playing mode, machine 112 issues instructions to devices 102–106 based on the ordered sequence stored in memory 110. Each instruction to a particular one of devices 102–106 contains a command to re-establish the state of the particular device that caused the particular device to previously issue the associated response. To this end, the instruction identifies the associated response, e.g., by a parameter, in a manner acceptable to the particular device. This command is required for all devices 102–106, or, equivalently, for their software representations. Accordingly, when machine 112 goes through the sequence of instructions to reestablish the associated state of the corresponding device, the concatenation of responses follows. In the above example, upon inserting a tape in VCR 102, TV 104 is switched on, the VCR-channel is automatically selected, and the lights are being dimmed according to the pre-set level.

In order to keep macros compact, responses preferably have a flag which indicates whether they are recordable or not. Some responses, such as those that indicate an external action (like the user inserting a tape), do not signify a state change that can be re-established on command at a later time.

In addition, control means 108 may pass any string of previously recorded responses that are contiguous and from the same device, back to the device to give it the opportunity to remove redundancy from the sequence. For example, if the user presses 'channel up' three times, three events will be recorded ('channel increased by unity to 7'—'channel increased by unity to 8'—'channel increased by unity to 9'), which the device may compress to one ('channel increased by 3 to 9'). Implicit in this example is another facet of recording responses: ambiguity of the user's intent. By pressing 'channel up' three times during the recording of the macro, did the user want the macro to increase the channel number by three when it is played, or go directly to the original channel that resulted from the user's actions? This ambiguity arises whenever both relative and absolute methods are available for changing some part of a device's state. By putting enough information in the response (i.e. both the relative and absolute change of state), as in the example, the user may choose between the two when editing the macro at a later point. If the event didn't include enough information, the software engineer makes the decision for the user, which is likely to be wrong (i.e., not what the user wanted) some significant proportion of the time.

Macro recording may be initiated other than at the user's request. Thus, multiple macros may be being recorded at the same time in a given system 100. As an example of the utility of this functionality, imagine an application that wishes to offer some automated functionality to the user, but since it may become complex and dependent on the user's system, allows him or her some freedom to alter it to his or her specific needs. Rather than 'hard-code' it into the application, and have to implement additional user interface functionality to allow it to be customized, it is easier and more consistent to use the macro system to record it, and offer a navigational user interface shortcut to the macro editor to allow the user to customize it.

A macro is played either at the user's request directly, or indirectly by being associated with a certain state of system 100 or with time. In the former case, the user-interface may support the ability to add a user-interface element which triggers the macro in various places under user control. In the latter case, control means 108 may be instructed to run the macro whenever a particular state occurs, or at a pre-specified time or date. This ability is offered to the user through an application, but devices 102–108 in system 100 are also able to make use of it. This is preferred over 'hard-wiring' integration features into applications, or worse still, into the software representations mentioned above, since it exposes the functionality to the user and allows it to be altered if it does not behave as he or she desires.

Flow diagram

Figure 2:
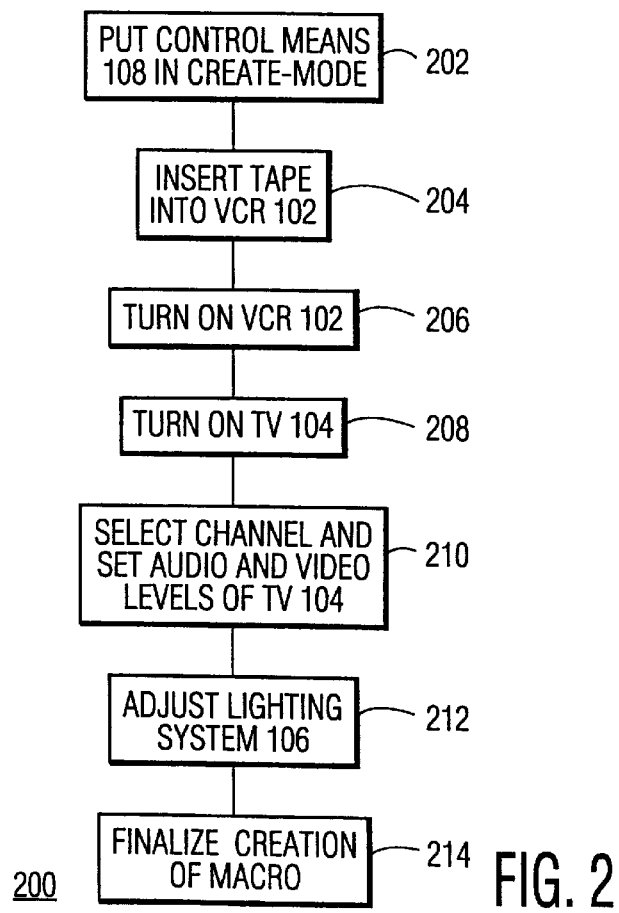
FIG. 2 is a flow diagram of a method of creating a macro.

FIG. 2 is a flow diagram 200 illustrating the creation of a macro for system 100. In step 202, the user puts control means 108 into the macro-creation mode. In step 204, the user inserts a tape in VCR 102. In step 206, the user turns on VCR 102. In step 208, the user turns on TV 104. In step 210, the user selects the appropriate channel, and sets the video and audio quality to the desired levels. In step 212, the user sets the ambient lighting to the desired level. In step 214, the user finalizes the creation of a macro that will, upon being called, perform steps 206–212 automatically in the designated order, or in another order that the user may specify afterwards.

We claim:

1. A control system comprising:

at least one electronic device; and control means coupled to the device for providing respective stimuli thereto in order to trigger a respective response of the device to each of said stimuli, each of which responses may be in the form of or as a consequence of a particular change of state of the device;

said control means comprising:

storage means for recording the respective responses of the device to the respective stimuli; and feedback means for relating each specific stored response to a specific stimulus for establishing a specific state of the device which constitutes or causes the device to supply said specific response, and supplying said specific stimulus to said device;

wherein in response to a specific stimulus supplied thereto the device establishes a specific state thereof which corresponds to said specific stimulus.

2. The system of claim 1, wherein the specific stimulus supplied by said control means identifies as a parameter thereof the specific response to be produced by said stimulus.

3. A method of creating and playing a macro instruction for a control system having at least one electronic device, said method comprising:

providing a control means coupled to at least one electronic device, said control means comprising a storage means and a feedback means;

providing, by said control means, a sequence of stimuli to the at least one electronic device, wherein said respective stimuli trigger a respective response of the device to each of said stimuli of said sequence, each of which responses may be in the form of or a consequence of a particular change of state of the device;

recording, in said storage means, a respective response of the device for each respective one of the stimuli of said sequence;

forming a macro instruction from said sequence of stimuli, each of said stimuli causing the device to change to a specific state which constitutes or causes the device to supply the specific response to which the particular stimulus relates, wherein said forming comprises relating, by said feedback means, each specific recorded response to a specific stimulus and supplying, by said feedback means, a specific stimulus to the device to re-establish a specific state thereof which corresponds to said specific stimulus.

4. The method of claim 3, wherein formation of said macro instruction comprises providing each specific stimulus with a parameter identifying the specific response to be produced by said stimulus.

* * * * *